M. SCHEY

1,480,119

ROTISSERIE

Filed Oct. 28, 1920    4 Sheets-Sheet 2

INVENTOR
Max Schey
BY Jas. H. Griffin
ATTORNEYS

Jan. 8, 1924. 1,480,119
M. SCHEY
ROTISSERIE
Filed Oct. 28, 1920 4 Sheets-Sheet 3

INVENTOR
Max Schey
BY Jas. H. Griffin
ATTORNEYS

Jan. 8, 1924.

M. SCHEY 1,480,119

ROTISSERIE

Filed Oct. 28, 1920    4 Sheets-Sheet 4

INVENTOR
Max Schey
BY Jas. H. Griffin
ATTORNEYS

Patented Jan. 8, 1924.

1,480,119

UNITED STATES PATENT OFFICE.

MAX SCHEY, OF BROOKLYN, NEW YORK.

ROTISSERIE.

Application filed October 28, 1920. Serial No. 420,190.

*To all whom it may concern:*

Be it known that I, MAX SCHEY, a citizen of the United States, residing at New York city, borough of Brooklyn, in the county of Kings and State of New York, have invented a certain new and useful Rotisserie, of which the following is a specification.

This invention relates to broiling apparatus of the character wherein one or more spits, adapted to support meat or poultry to be roasted, is, or are, supported for rotation in proximity to a source of heat which may, in practice, be a bed of hot coals, a gas burner plate, or an electric heater.

It is well known by experienced chefs that the best results in the broiling of meats and poultry are obtained through a frequent basting during the roasting operation and this is frequently accomplished, when the baking is carried on in ovens, by periodically spooning or ladleing the grease in the roasting pan over the fowl or meat. The basting of meats or poultry during cooking imparts to them a rich brown coloring without burning or undue crispness and, moreover, enhances the flavor of the resulting roast.

Machines wherein the meat is supported on spits positioned forwardly of the source of heat have been long employed and it is the practice in machines of this character to position beneath each spit a drip pan into which the grease from the roast drips. It has been the practice, moreover, for a chef from time to time to dip the grease from the pan by means of a ladle or spoon and baste the fowl or meats much after the same manner as is done when cooking in ovens. A very universal practice is to employ a brush or whiskbroom for the basting of meats in this form of apparatus and this is accomplished by dipping the brush into the grease and then applying it to the surface of the roast.

The foregoing practices are not only tedious, but are open to many disadvantages. For example, the heat in the proximity of the roast when in position on the spit before the fire, is intense and the hand of the operator must be thrust into this heat in order to manually carry on the basting operations as described. Furthermore, when basting in either of the ways referred to, considerable spattering of the grease results, thereby rendering it difficult to keep the machine clean and free from spattered grease. Moreover, practice has proven that when gas burners are used as a source of heat, the spattering of the grease in the manner described, frequently results in clogging of the burner outlets thereby greatly impairing the efficiency of the latter.

A further and important consideration with reference to said prior methods resides in the fact that it is practically impossible to uniformly baste meat in the manual manner described.

With these considerations in mind, the fundamental object of the present invention is to provide means, whereby the meat or poultry on any spit, may, at the will of the chef, or automatically, be momentarily dipped or partially submerged in the grease and drip pan and immediately thereafter returned to the normal roasting position before the fire. In the preferred manner of carrying out this object, the roast is rotated while partially submerged in the grease, thereby obviating the necessity of a large volume of grease and assuring a better distribution of the same over the surface of the roast. Moreover, while this dipping or basting of the roast may be automatically accomplished periodically, it is preferably accomplished through manual operable means, the prime mover of which is positioned at such distance from the fire as to remain cool at all times, so that it may be readily operated by the chef in a convenient, accessible and efficient manner.

A further object of the present invention is to provide means whereby a spit with roast thereon may be efficiently moved toward and away from the fire without requiring the chef to actually touch the spit itself which, in some forms of machines, during the roasting operation, becomes too warm or hot to be conveniently handled.

In machines of the character described, it has been common to mount a plurality of spits in superimposed relation before a substantially vertically positioned source of heat and to provide in the lowermost spit a drip pan into which the grease from all of the spits is adapted to drop. The disadvantage of such construction is that it is frequently desired to roast fowl on one of the spits and different meats on the other spits and grease from all of the different meats and fowls are received in the same drip pan. When the various roasts on the several spits are basted with this grease, the flavor of any particular roast is apt to be changed through the grease from the other roasts and the best results are not obtainable.

Another object of the present invention is to provide a drip pan for each spit so that the grease from the several different kinds of meats or fowl may be kept separate and the taste preserved. By providing a drip pan for each spit, I am able to employ an improved form of tiltable drip pan adjustable in accordance with the amount of grease therein to supply the proper amount to the roasts for the most efficient basting purposes.

A further feature of the invention is to construct a broiling apparatus with a plurality of spits each of which is heated by a separate heating unit any one of which may be operated to the exclusion of the others or all of which may be operated together. The advantage of this construction is that only that heating unit which is required to furnish heat to any particular spit is necessarily operated when said spit is in use and the other spits idle. This effects a considerable saving and fuel consumption.

Features of the invention, other than those adverted to, will be apparent from the hereinafter detailed description and claims, when read in conjunction with the accompanying drawings.

Mechanisms of the general character described, i. e., apparatus, wherein meat or fowl is supported on one or more spits before the fire, are generally known to the trade as "rotisseries," and, accordingly, this term will be employed throughout the following detailed description of the apparatus.

The accompanying drawings illustrate one practical embodiment of the present invention, but the construction therein shown is to be understood as illustrative, only, and not as defining the limits of the invention.

Figures 2, 3, 4, 5 and 6 are diagrammatic views looking from one end of the rotisserie and illustrating the manner in which the several spits may be manually operated to effect the basting operation.

Figure 7 illustrates the manner in which one of the spit movements is counterbalanced.

Figure 1:
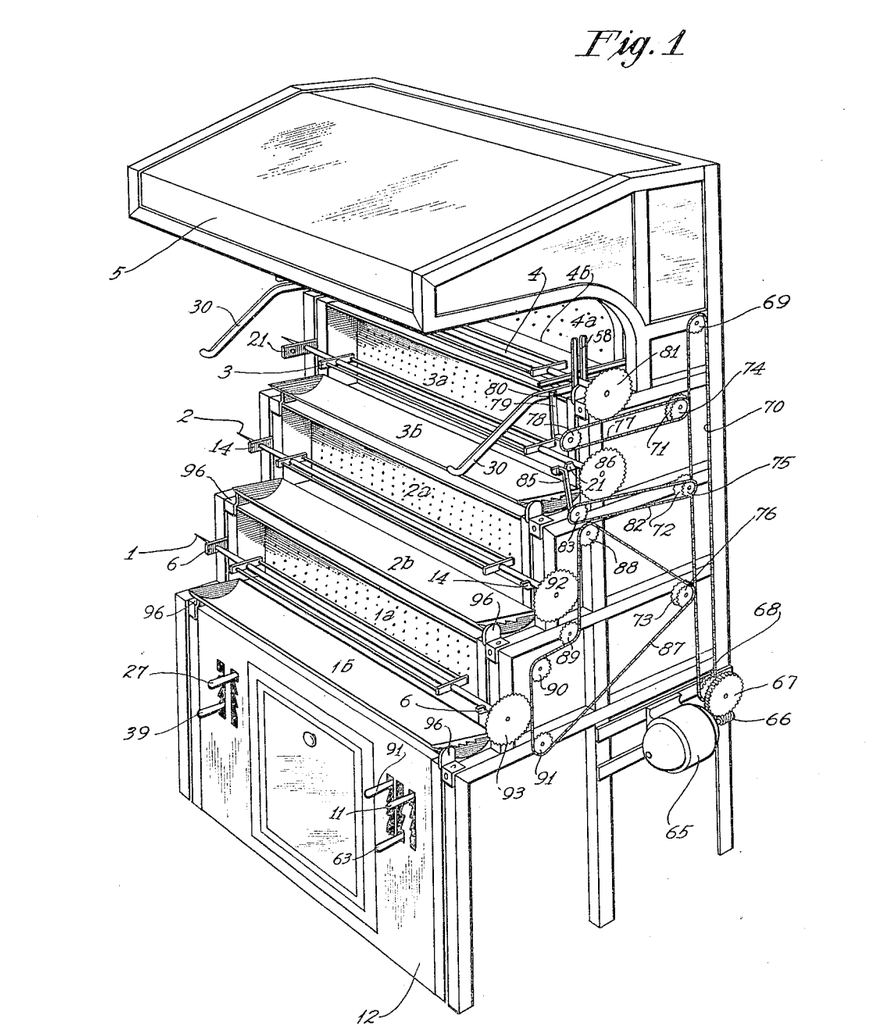
Figure 1 is a perspective view of a rotisserie embodying the present invention. In this view, a machine is shown embodying a plurality of spits, separate heating means for each spit and means for individually operating the spits.

The machine which is shown in Figure 1 is a four spit rotisserie, the four spits of which are designated 1, 2, 3 and 4. These spits are placed one above the other in offset relation and heat is supplied to each of them individually by burners 1ª, 2ª, 3ª and 4ª, respectively, although coal fires may be employed if desired. The spits and burners are supported in a suitable frame, which frame may vary in shape and form without departing from the spirit of the invention, and as the frame may be made in a great many ways, it has not been considered necessary to show the full details thereof, since its structure will be manifest from the drawing to any one skilled in the art. The upper portion of the frame preferably supports a hood 5, which may be connected to a chimney for the purpose of carrying off odors or vapors generated during the roasting of meats or fowls on the spits.

Positioned below each spit when such spits are in normal position before their respective fires are drip pans 1ᵇ, 2ᵇ, 3ᵇ and 4ᵇ, respectively, and each of these drip pans are adapted to receive the grease which drips from the roasts on the respective spits and the spits are so mounted that, at the will of the operator, they may be raised or lowered for the purpose of dipping the roast into the grease in the drip pans and basting such roasts in an automatic manner. To enable this operation to be carried out, each of the spits is mounted so that it may be raised or lowered, and in Figures 2-7 inclusive, the mechanism for operating the several spits for this purpose is illustrated. The operating means for the several spits will now be described.

Figures 2, 3, 9:
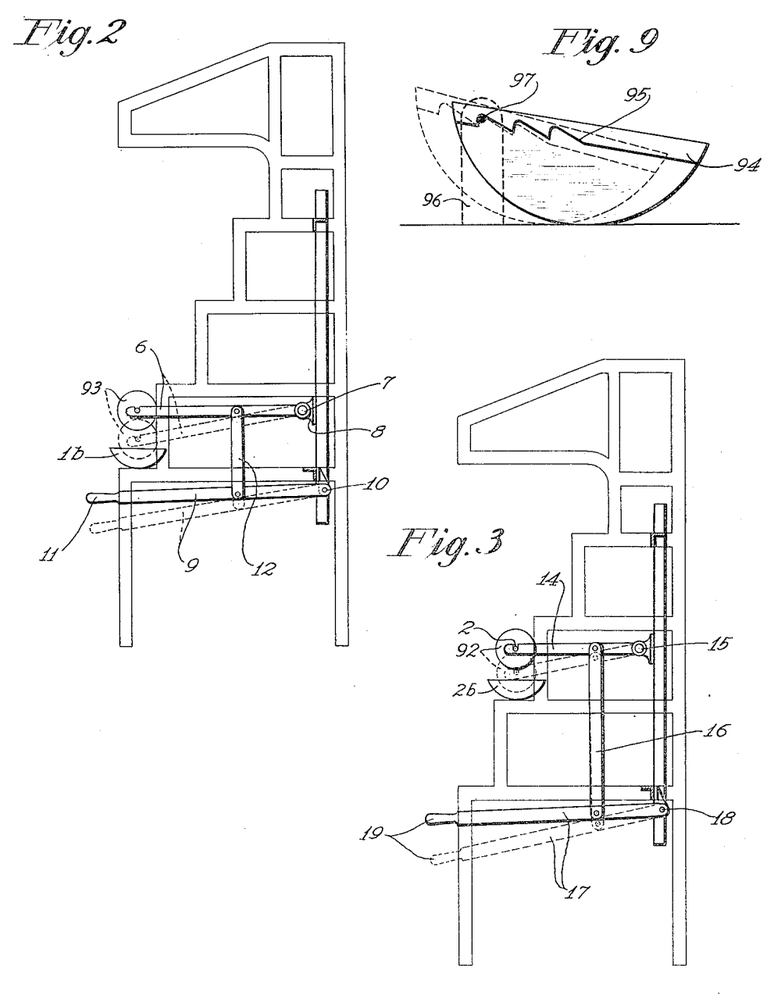

The first or lowermost spit 1 is supported adjacent the opposite ends of carrier arms 6, one of which is shown in Figure 2. One carrier arm is positioned adjacent each end of the frame and the rear end of each carrier arm 6 is fixed on a rock shaft 7 which extends longitudinally of the frame. Both carrier arms are thus pivotally carried by the rock shaft for simultaneous pivotal movement. The rock shaft is journalled for oscillating movement in brackets 8 as clearly shown, which brackets are, in turn, rigidly secured to some rigid part of the frame. Extending fore and aft of the frame, and at one end thereof, is an operating lever 9 pivoted at 10 to some rigid part of the frame at its rear end and having its forward end projecting beyond the front of the rotisserie and provided with a handle 11, whereby pivotal movement in a vertical plane may be imparted thereto. The operating lever 9 is connected by a link 12 to one of the carrier arms 6, so that by grasping the handle 11 and raising or lowering the lever 9, similar pivotal movement is imparted to the carrier arms 6 and the spit may be lowered or raised from the full line position of Figure 2 wherein it is in normal roasting position before the fire, to the basting position shown in dotted lines, wherein roasts on the spit will dip into the grease in the drip pan 1ᵇ.

By mechanism hereinafter more fully described, the spit is constantly rotated, while in either position, so that by dipping a portion of the roast into the grease in the drip pan, rotation of the spit will cause a successive dipping of all portions of the roast into the grease, so that the basting operation is efficiently carried out.

The handle 11 extends through a slot in the front plate 12 of the rotisserie and the sides of the slot are notched or serrated, so that when the handle is in raised position, the lever 9 may be brought into engagement with one of the serrations to normally support the weight of the roast and maintain the carrier arms in such position that the spits will remain in the normal roasting position.

In Figure 3 of the drawings, an arrangement is shown, whereby the second spit 2 is operated, and from this showing, it will be apparent that the mechanism employed is substantially the same as that shown in Figure 2. The spit 2 is supported at its opposite ends by carrier arms 14 rigid at their rear ends with a rock shaft 15 extending transversely of the frame and pivoted on brackets corresponding to the brackets 8. A link 16 connects one of the carrier arms 14 to an operating lever 17 pivoted to the frame at 18 and provided at its forward end with an operating handle 19, corresponding to the handle 11. This handle 19 may be operated in the same manner as the handle 11 to raise and lower the spit from basting position into normal roasting position and vice versa, and the handle may be locked in any desired position through engagement with the serrated side of the opening 20 in the front plate 12, through which it protrudes.

Figure 4:
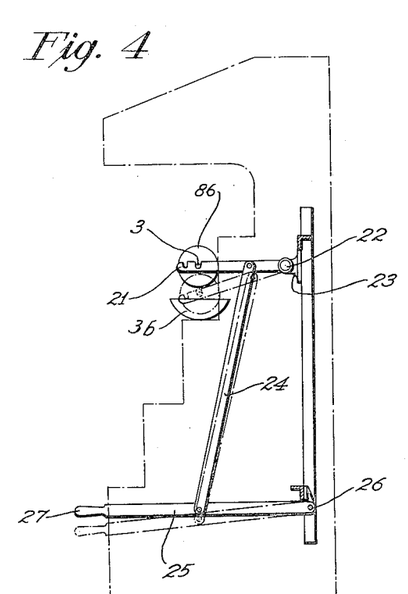

In Figure 4 of the drawings, the mechanism shown for operating the third spit 3 is substantially the same as that shown in Figure 3. The opposite ends of the spits are supported in carrier arms 21, which are fixed at their rear end to a rock shaft 22 pivoted for oscillation in brackets 23. A link 24 connects one of the carrier arms to a lever 25 pivoted at 26 to the frame and provided at its forward end with a handle 27 which may be raised and lowered to raise and lower the spit and may be locked in desired position by engagement with the serrated side of the opening 28 in the front plate 12, through which it protrudes.

Figure 5:
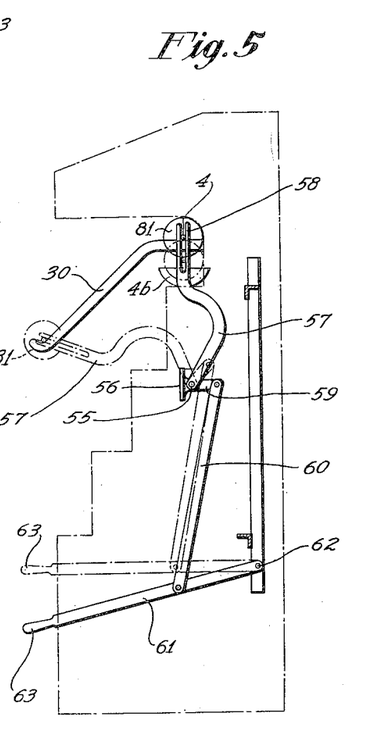
Figures 6, 7:
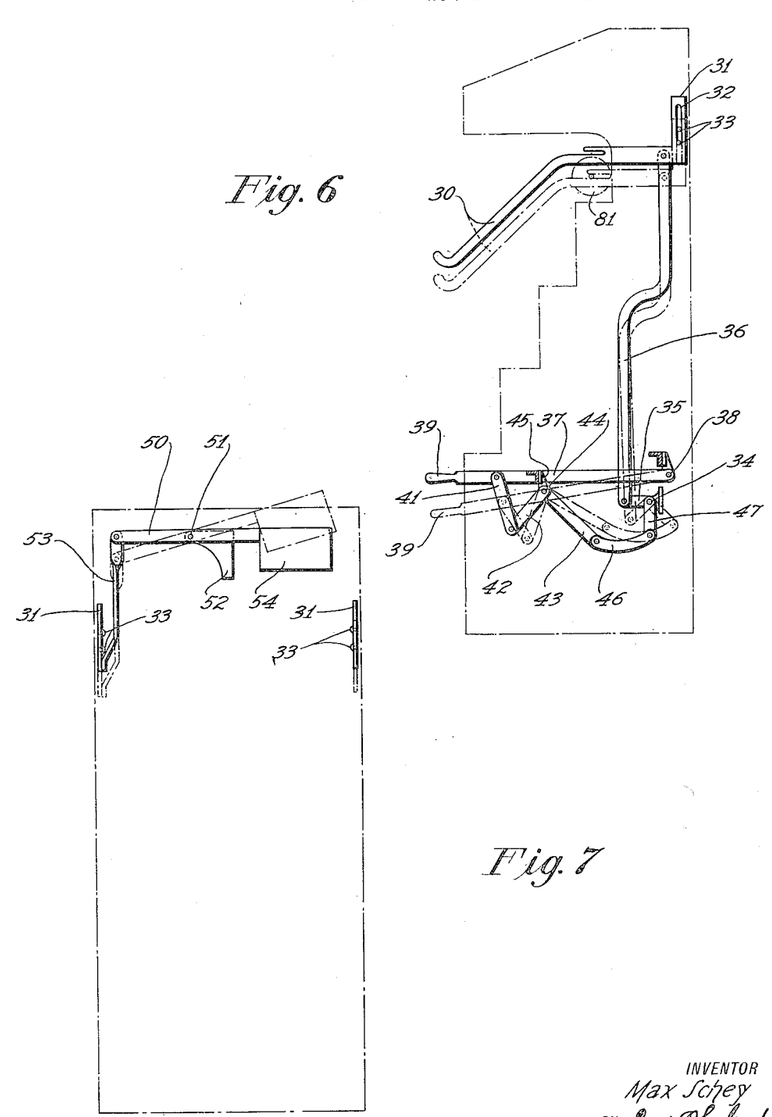

In Figures 5, 6 and 7, the mechanism for operating the fourth or top spit 4 is illustrated. This top spit may be operated in the same manner as the other spits, but as the rotisserie is rather high in practice and the spit 4 rather difficult to reach, I preferably so mount and operate the spit that it is not only movable into and out of basting position, but may be also shifted in an outward and downward direction, so that the roast may be positioned on or removed from the spits. All of the spits may be mounted for operation in this manner, but the simply operating mechanism hereinbefore described is preferred for them.

The spit 4 is supported on a pair of bent carrier arms 30, one of which is positioned at each end of the frame and, instead of being pivoted as the arms 6, 14 and 21, are supported in the frame for vertical sliding movement. To this end, each arm 30 is provided with an upstanding bracket 31 slotted at 32 and through each slot 32 extends a plurality of bolts 33, securing the bracket for vertical sliding movement to the frame, so that each bracket and associated arm 30 may be raised into the full line position of Figure 6, which is the normal roasting position or may be depressed to the dotted line position of Figure 6, which is the basting position. Substantially the forward half of each carrier arm 30 is inclined downwardly and forms a track on which the spit may be slid in a direction toward the fire or away from and downwardly with respect thereto.

Extending transversely of the frame of the rotisserie and in the lower portion thereof is a rock shaft 34 and adjacent each end of the rock shaft, a rigid frame 35 is mounted thereon. Each rigid arm 35 is secured to one of the carrier arms 30 by means of a link 36, so that when the rock shaft is oscillated, the movement will be imparted through the arms 35 and links 36 to raise and lower the carrier arms 30 simultaneously, while they are maintained in uniform horizontal position by the cooperating brackets 31 and bolts 33.

For manually effecting this operation from a convenient and accessible position, the lever 37 is provided which is pivoted at 38 to a bracket rigid with the frame and is provided at its forward end with a handle 39 projecting through a slot 40 in the front plate 12, and having one lateral edge thereof serrated to maintain the parts in adjustment. Pivoted to the lever intermediate its ends is one end of a link 41, the other end of which is pivoted to one arm 42 of the bell crank having a second arm 43. The bell crank is pivoted at 44 to a bracket 45 rigid with the frame, so that when the handle 39 is operated, the link 41 will impart pivotal movement to the bell crank. Attached to the free end of the arm 43 of the bell crank is a second link 46 which connects the bell crank to an arm 47 rigid with the rock shaft 34. When the handle 39 is operated, from the full line position of Figure 6 to the dotted line position therein, downward pressure on the handle will result in downward pressure on the link 41 to the arm 42 of the bell crank, so that the bell crank will be tilted and through its arm 43 will force the link 46 in a rearward direction, thereby swinging the arm 47 rearwardly and oscillating the rock shaft 34 in a counterclockwise direction with the result that the links 36 are lowered, the carrier arms 30 correspondingly depressed and the spit 4 brought into a position to partly immerse roasts supported thereon in grease contained in the cooperating drip pan. By reversal of these operations, the spit may be returned to the roasting position.

Since the mechanism referred to may be more or less heavy with large roasts positioned thereon, such mechanism is preferably counterbalanced after the manner shown in Figure 7. An arm 50 extends transversely of the frame and is pivoted intermediate its ends at 51 on a bracket 52. One end of the arm 50 is secured by a link 53 to one of the brackets 31, while the other end of the arm 50 is provided with a suitable weight or counterbalance 54 by virtue of which the parts are counterbalanced, so as to be more easily operable by the chef.

In Figure 5 of the drawings, mechanism is shown whereby the spit may be moved toward and away from the fire by shifting the same in a forwardly or rearwardly direction on the carrier arms 30. To this end, a rock shaft 55 extends transversely of the frame and is mounted for oscillation in brackets 56. Adjacent each end of the rock shaft 55 is fixed an upstanding arm 57, the upper ends of which are bifurcated as at 58 so as to straddle the opposite ends of the spit 4, as shown in Figures 1 and 5. Rigidly fixed to the rock shaft 55 is an arm 59 which is connected by a link 60 to a lever 61 pivoted on its rear end 62 to the frame and provided at its forward end with a handle 63. If the handle 63 is lifted from the full line position of Figure 5 to the dotted line position thereof, the link 60 will be raised causing the rock shaft 55 to oscillate in a counterclockwise direction, carrying therewith the arms 57 from the full line position of Figure 5 to the dotted line position thereof, whereby the spit 4 is slid longitudinally of the carrier arms 30 from normal broiling position to a position forwardly and downwardly wherein it is more accessible to be removed from the machine. The spit may be returned to broiling position by reversal of the operations described.

The handle 63 protrudes through an opening 64 in the front of the plate 12, one edge of which opening is serrated to lock the handle in any position desired.

In order that the rotisserie may properly function, it is essential that means be provided for rotating the spits during the roasting of meats thereon and in accordance with this invention this means is so arranged that it is capable of rotating the roasts during the basting operation, so that the best results may be obtained. While the means for accomplishing this end may vary, the following construction is preferred.

Power is applied from a prime mover 65 shown in the form of an electric motor provided on its armature shaft with a worm 66 driving a worm wheel 67 on a common shaft with which is fixed a sprocket 68. These parts are positioned in the lower part of the machine and on the upper part of the machine is mounted a second sprocket 69. A sprocket chain 70 passes around the sprockets 68 and 69. Meshing with the sprocket chain 70 are three drive sprockets 71, 72 and 73 mounted on the frame in any suitable manner. On a common shaft with the sprocket 71 is fixed a sprocket 74; on a common shaft with the sprocket 72 is fixed a sprocket 75; and, on a common shaft with the sprocket 73 is fixed a sprocket 76. The sprocket 74 is adapted to rotate the spit 4, the sprocket 75 is adapted to rotate the spit 3, while the sprocket 76 is adapted to rotate the spits 1 and 2. To this end, a sprocket chain 77 passes around the sprocket 74 and is also passed around a sprocket 78 supported on a bracket 79 carried by one of the carrier arms 30 after the manner shown in Figure 1.

A gear 81 fixed on one end of the spit 4 is adapted to mesh with the sprocket chain 77 and derive driving power therefrom to the end that the spit may be rotated. Since the sprocket 78 is carried by one carrier arm 30, it will be apparent that even though the spit is raised or lowered, the gear of sprocket 81 will remain in mesh with the sprocket chain 77, so that the spit will be rotated when it is depressed and in basting position and also when it is in elevated or roasting position. When the spit is slid forwardly away from the fire, the sprocket 81 will merely ride off the end of the chain 77 and when returned to roasting position will re-engage with the chain. In practice, a rod or bar preferably extends between the spindles which support the sprockets 74 and 78 so as to maintain them in correct spaced relation. This has been omitted in the showing of Figure 1, but will be apparent in the hereinafter description of Figure 8.

Figure 8:
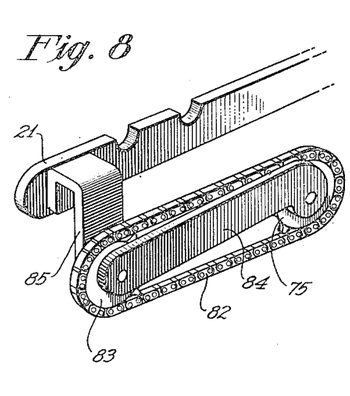
Figure 8 is a detail fragmentary perspective illustrating a portion of the spit driving means; and, Figure 9 is an end view of one of the drip pans showing the manner in which it may be manipulated in accordance with the amount of grease therein to effect proper basting.

Figure 8 is a detail showing of a part of the drive mechanism for the spit 3. The sprocket 75 obtains driving power from the main drive sprocket chain 70 through the sprocket 72 and transmits power through a chain 82 to a second sprocket 83, which is spaced from the sprocket 75 by a spacing bar 84 secured at its opposite ends to the spindles of the respective sprockets. The sprocket 83 is, in turn, supported by a hanger 85 from one of the carrier arms 21 of the spit 3, so that as the spit is raised or lowered, the sprocket 83 and cooperating chain 82 are correspondingly removed, so that the chain is maintained at all times in mesh with a sprocket 86 permanently secured to one end of the spit 3, even though the spit be raised or lowered through the operation of its operating handle 27, and its driving connections will remain intact for the reasons specified. However, the spit may be lifted out of the machine at any time to remove from or position the roasts thereon and when returned to the machine its sprocket will fall into mesh with the drive chain 82.

The spits 1 and 2 are driven through a common sprocket chain 87 which passes around the sprocket 76 and also around directional sprockets 88, 89, 90 and 91, all of which are mounted for rotation on the frame on fixed spindles. The sprockets 88 and 89 are so positioned that the reach of the chain extending between these sprockets will run in a vertical direction and the same is true of the sprockets 90 and 91. This construction enables a gear 92, permanently secured to one end of the spit 2, to remain in driving relation to the sprocket chain 87, while the spit is raised or lowered from basting to roasting positions and vice versa. In like manner, a sprocket 93 permanently fixed on one end of the spit 1 remains in engagement with the chain intermediate the directional sprockets 90 and 91.

By the driving arrangements specified, the spits are mounted to be driven at a uniform speed, while the roasts are before the fire and in roasting position and also permits of the revolving of the roasts when they are in lowered position and partially submerged in gravy so that proper basting may be had. The sprocket and chain arrangements described operate with high efficiency, but other form of drive means may be employed without departing from the present invention.

In Figure 9, there is illustrated an improved form of a drip pan preferably employed. The drip pan is provided with an open top, closed ends and a curved bottom as shown and its opposite ends are provided with a rib or flange 94, which is serrated at 95. Rigidly mounted on the frame adjacent the opposite end of each drip pan are brackets 96, each of which carries a pin 97. The drip pans are adapted to rest on the frame of the machine or table or plate covering the same and the serrations at the opposite ends of each drip pan are adapted to hook over the pins 97 of the brackets 96. The pins are positioned at a small distance further above the table or frame on which the drip pan rests than the distance between the bottom of the drip pan and the serrations 95, so that by hooking each serration over the pins the angular inclination or degree of tilting of the drip pan may be regulated. If a small amount of grease is in the pan, the pan should be tilted to a greater extent and serrations relatively adjacent the medial line of the pan should engage with the pins 97. However, if the pan contains a greater amount of grease, it should partake of a substantially horizontal position to obtain which the pins 97 should be engaged with serrations adjacent the forward edge of the pan. In this manner, the drip pans may be readily regulated so as to supply the proper amount of grease for the basting operation.

Having thus fully described the invention, what I claim as new and desire to secure by Letters Patent is:

1. A rotisserie embodying a spit adapted to support a roast, a receptacle adapted to contain grease positioned below the spit, and means for bodily lowering and raising the spit from roasting position before the fire to basting position wherein the roast is partially submerged in the grease in said receptacle, and lifted therefrom.

2. A rotisserie embodying a spit adapted to support a roast, a receptacle adapted to contain grease positioned below the spit, and means for bodily lowering and raising the spit from roasting position before the fire to basting position wherein the roast is partially submerged in the grease in said receptacle, and lifted therefrom and means for rotating the spit while it is in broiling and roasting positions.

3. A rotisserie embodying a spit adapted to support a roast, a receptacle adapted to contain grease positioned below the spit, and means for bodily lowering and raising the spit from roasting position before the fire to basting position wherein the roast is partially submerged in the grease in said receptacle, and lifted therefrom, and driving connections with the spit, said driving connections being operable to rotate the spit in both raised and lowered positions.

4. A rotisserie embodying a spit adapted to support a roast, a receptacle adapted to contain grease positioned below the spit, means for bodily lowering and raising the spit from roasting position before the fire to basting position wherein the roast is partially submerged in the grease in said receptacle, and lifted therefrom, a gear on the spit, and a driven member meshing with the gear at all times when the spit is in the rotisserie, whereby the spit is rotated while in basting as well as in roasting positions.

5. A rotisserie embodying a spit adapted to support a roast, a receptacle adapted to contain grease positioned below the spit, means for bodily lowering and raising the spit from roasting position before the fire to basting position wherein the roast is partially submerged in the grease in said receptacle, and lifted therefrom, a gear on the spit, and a driving sprocket chain with which the gear is adapted to automatically mesh when the spit is placed in the rotisserie, said chain being mounted and positioned to rotate the spit in basting as well as in roasting positions.

6. A rotisserie embodying a spit adapted to support a roast, a receptacle adapted to contain grease positioned below the spit, means for bodily lowering and raising the spit from roasting position before the fire to basting position wherein the roast is partially submerged in the grease in said receptacle, and lifted therefrom, a gear on the spit, a driving sprocket chain with which the gear is adapted to automatically mesh when the spit is placed in the rotisserie, said chain being mounted for movement with the spit whereby the gear and chain are kept in mesh during the raising and lowering of the spit and serve to rotate the spit in basting as well as in roasting positions.

7. A rotisserie embodying a plurality of spits adapted to support roasts, a drip pan below each spit, means for bodily raising and lowering the spits from broiling positions before the fire to basting positions wherein the roasts are partially submerged in grease contained in their drip pans, and lifted therefrom.

8. A rotisserie embodying a plurality of spits adapted to support roasts, a drip pan below each spit, means for bodily raising and lowering the spits from broiling positions before the fire to basting positions wherein the roasts are partially submerged in grease contained in their drip pans, and lifted therefrom, and means for rotating the spits while in basting as well as in roasting positions.

9. A rotisserie embodying a plurality of spits adapted to support roasts, a drip pan below each spit, means for bodily raising and lowering the spits from broiling positions before the fire to basting positions wherein the roasts are partially submerged in grease contained in their drip pans, and lifted therefrom, a gear on each spit, and means common to a plurality of spits for driving them in both raised and lowered positions.

10. A rotisserie embodying a plurality of spits adapted to support roasts, a drip pan below each spit, means for bodily raising and lowering the spits from broiling positions before the fire to basting positions wherein the roasts are partially submerged in grease contained in their drip pans, and lifted therefrom, a gear on each spit, and common driving means with which the gears of a plurality of spits are adapted to automatically mesh when the spits are placed in the rotisserie, said driving means being so mounted that said spits are rotatable thereby when in basting as well as in roasting positions.

11. A rotisserie embodying a plurality of spits adapted to support roasts, a drip pan below each spit, means for bodily raising and lowering the spits from broiling positions before the fire to basting positions wherein the roasts are partially submerged in grease contained in their drip pans, and lifted therefrom, and a common driving sprocket chain with which the gears of a plurality of spits are adapted to automatically mesh when the spits are placed in the rotisserie, said sprocket chain being so mounted that the spits are rotatable thereby when in basting as well as roasting positions.

12. A rotisserie embodying a plurality of spits mounted for rotation on horizontal axes at consecutively higher elevations, whereby they are positioned above one another, and a drip pan beneath each spit.

13. A rotisserie embodying a plurality of spits mounted for rotation on horizontal axes in different horizontal planes, whereby the spits are positioned above one another, a drip pan beneath each spit, and a separate source of heat for each spit.

14. A rotisserie embodying a plurality of spits mounted for rotation on horizontal axes above one another, a drip pan for each spit, and means for rotating the spits.

15. A rotisserie provided with a stepped front, a source of heat in the riser of each step, a spit positioned above each tread and mounted for rotation on a horizontal axis, and a drip pan positioned on each tread.

16. A rotisserie embodying a source of heat, a pair of movable carrier arms, a spit mounted for rotation on the carrier arms, a drip pan positioned below the spit and means for raising and lowering the carrier arms to move the spit from a roasting position to a position wherein the roasts on the spit will be partially submerged in the grease in the drip pan and lifted therefrom.

17. A rotisserie embodying a source of heat, a pair of movable carrier arms, a spit mounted for rotation on the carrier arms, a drip pan positioned below the spit and means for raising and lowering the carrier arms to move the spit from a roasting position to a position wherein the roasts on the spit will be partially submerged in the grease in the drip pan and lifted therefrom, and means for also moving the spit longitudinally of the carrier arms toward and away from the source of heat.

18. A rotisserie embodying a spit, a drip pan positioned below the spit and adapted to contain grease, means for raising and lowering the spit for the purpose of basting the roasts supported thereby in the grease in the drip pan and means for supporting the drip pan in different positions to regulate the depth of grease in the drip pan.

19. A rotisserie embodying a spit, a drip pan positioned below the spit and adapted to contain grease, means for effecting relative movement between the drip pan and spit for the purpose of causing roasts supported on the spit to be immersed in the grease of the drip pan, and means for supporting the drip pan in different positions to regulate the depth of grease in the drip pan.

20. A drip pan for rotisseries provided with an open top and having a curved bottom adapted to rest upon a flat surface, a plurality of serrations along the opposite ends of the pan, and means adapted for engagement with the serrations for holding the pan tilted in various angular positions to vary the depth of the pool of grease therein.

21. A rotisserie embodying a spit, a drip pan positioned below the spit and adapted to contain grease, and means for effecting relative movement between the drip pan and the spit, whereby one is moved toward and away from the other for the purpose of causing roasts supported on the spit to be immersed in the grease in the drip pan.

In testimony whereof, I have signed my name to this specification.

MAX SCHEY.